(12) United States Patent
Fernandes et al.

(10) Patent No.: US 8,677,330 B2
(45) Date of Patent: Mar. 18, 2014

(54) PROCESSORS AND COMPILING METHODS FOR PROCESSORS

(75) Inventors: Marcio Merino Fernandes, Campinas (BR); Raymond Malcolm Livesley, Binfield (GB)

(73) Assignee: Altera Corporation, San Jose, CA (US)

( * ) Notice: Subject to any disclaimer, the term of this patent is extended or adjusted under 35 U.S.C. 154(b) by 426 days.

(21) Appl. No.: 12/797,160

(22) Filed: Jun. 9, 2010

(65) Prior Publication Data

US 2010/0251229 A1    Sep. 30, 2010

Related U.S. Application Data

(62) Division of application No. 10/491,926, filed as application No. PCT/GB02/04538 on Oct. 7, 2002, now Pat. No. 7,747,990.

(60) Provisional application No. 60/338,396, filed on Dec. 6, 2001.

(30) Foreign Application Priority Data

Oct. 12, 2001    (GB) .................................. 0124553.9

(51) Int. Cl.
*G06F 9/45*    (2006.01)

(52) U.S. Cl.
USPC ........... 717/140; 717/141; 717/149; 717/150; 717/159; 717/160

(58) Field of Classification Search
USPC .......... 717/140, 141, 149, 150, 159, 160, 161
See application file for complete search history.

(56) References Cited

U.S. PATENT DOCUMENTS 5,202,975 A    4/1993    Rasbold et al.
5,230,053 A    7/1993    Zaiki (Continued)

FOREIGN PATENT DOCUMENTS

EP    0 481 615    4/1992
GB    2 355 094    4/2001

OTHER PUBLICATIONS

Fernandes et al.; "Distributed Modulo Scheduling"; High-Performance Computer Architecture, 1999. Proceedings. Fifth Int'l. Symposium, Orlando, FL, USA-9-13; Jan. 1999, Los Angeles, CA, IEEE Comput. Soc., Jan. 9, 1999, pp. 130-134.

(Continued)

*Primary Examiner* — Qamrun Nahar
(74) *Attorney, Agent, or Firm* — Greer Burns & Crain Ltd.

(57) ABSTRACT

A compiling method compiles an object program to be executed by a processor having a plurality of execution units operable in parallel. In the method a first availability chain is created from a producer instruction (p1), scheduled for execution by a first one of the execution units ($2_0$: AGU), to a first consumer instruction (c1), scheduled for execution by a second one of the execution units ($2_2$: EXU) and requiring a value produced by the said producer instruction. The first availability chain comprises at least one move instruction (mv1-mv3) for moving the required value from a first point ($2_0$: ARF) accessible by the first execution unit to a second point ($2_2$: DRF) accessible by the second execution unit. When a second consumer instruction (c2), also requiring the same value, is scheduled for execution by an execution unit ($2_3$: EXU) other than the first execution unit, at least part of the first availability chain is reused to move the required value to a point ($2_3$: DRF) accessible by that other execution unit. In other compiling methods (FIG. 8), the object program includes a loop kernel block and a basic block preceding the loop kernel block, and the basic block includes a producer instruction (p1) and the loop kernel block includes a consumer instruction (c1, c2) requiring a value produced by the producer instruction. The loop kernel block is scheduled first, after which the basic block is scheduled. These methods can put additional move instructions between producer and consumer instructions in the basic block instead of the loop kernel block, or eliminate the move instructions altogether.

20 Claims, 10 Drawing Sheets

(56) References Cited

U.S. PATENT DOCUMENTS

| | | | |
|---|---|---|---|
| 5,293,631 | A | 3/1994 | Rau et al. |
| 5,307,478 | A | 4/1994 | Rasbold et al. |
| 5,367,651 | A | 11/1994 | Smith et al. |
| 5,379,428 | A | 1/1995 | Belo |
| 5,526,499 | A * | 6/1996 | Bernstein et al. .............. 712/216 |
| 5,557,761 | A | 9/1996 | Chan et al. |
| 5,699,537 | A | 12/1997 | Sharangpani et al. |
| 5,835,776 | A | 11/1998 | Tirumalai et al. |
| 5,930,510 | A | 7/1999 | Beylin et al. |
| 6,016,540 | A | 1/2000 | Zaidi et al. |
| 6,092,097 | A | 7/2000 | Suzuoka |
| 6,240,510 | B1 | 5/2001 | Yeh et al. |
| 6,334,182 | B2 | 12/2001 | Merchant et al. |

OTHER PUBLICATIONS

Gupta et al.; "A Unified Framework for Optimizing Communication in Data-Parallel Programs"; IEEE Trans. on Parallel and Distributed Systems; IEEE, New York, vol. 7, No. 7; Jul. 1, 1996; pp. 689-704.

Kailas et al.; "Cars: A New Code Generation Framework for Clustered ILP Processors"; HPCA. The Seventh Int'l. Symposium on Monterrey Mexico Jan. 19-24, 2001; Los Alamitos, CA, IEEE Comput. Soc., Jan. 19, 2001; pp. 133-143.

Kubota et al.; "A Technique to Eliminate Redundant Inter-Processor Communication on Parallelizing Compiler TINPAR"; Int'l. Journal of Parallel Programming; Penum Press, New York, Vo. 27, No. 2; Apr. 1999; pp. 97-109.

Tang et al.; "Reducing Data Communication Overhead for DOAcross Loop Nests"; Conference proceedings 1994; Int'l. Conference on Supercomputing, Manchester, UK; Jul. 11-15, 1994; ACM Int'l. Conference on Supercomputing, New York, NY; ACM, vol. $8^{th}$ Conf.; Jul. 11, 1994; pp. 44-53.

Fernandes et al.; "A Clustered VLIW Architecture Based on Queue Register Files"; PhD thesis; Edinburgh University; Jan. 1999; pp. 1-171.

Lee, et al. "Space-Time Scheduling of Instruction-Level Parallelism on a Raw Machine," 1998, ACM, p. 46-57.

Schuette, et al. "An Instruction-Level Performance Analysis of the Multiflow TRACE 14/300,"1991, ACM p. 2-11.

Stotzer, et al. "Modulo Scheduling for the TMS320C6x VLIW DSP Architecture," 1999, ACM, p. 28-34.

Lapinskii, et al., "High-Quality Operation Binding for Clustered VLIW Datapaths," 2001, ACM p. 702-707.

Dagum, et al. "OpenMP: An Industry-Standard API for Shared-Memory Programming," 1998, IEEE, p. 46-55.

\* cited by examiner

PROCESSORS AND COMPILING METHODS FOR PROCESSORS

This application is a Divisional of U.S. application Ser. No. 10/491,926, filed Oct. 1, 2004, which claims priority under 35 U.S.C. §119 from U.S. Provisional Application No. 60/338,396, filed Dec. 6, 2001, and Great Britain Application No. 0124553.9, filed Oct. 12, 2001.

BACKGROUND OF THE INVENTION

The present invention relates to processors and compiling methods for processors. In particular, but not exclusively, the present invention relates to processors having distributed functional units and register files and to compiling methods for such processors.

In high-performance computing, a high rate of instruction execution is usually required of the target machine (e.g. microprocessor). Execution time is often dominated by loop structures within the application program. To permit a high rate of instruction execution a processor may include a plurality of individual execution units, with each individual unit being capable of executing one or more instructions in parallel with the execution of instructions by the other execution units. The instructions to be executed in parallel may be combined together in a very long instruction word (VLIW) packet.

A compiling method for such a VLIW processor schedules an instruction by assigning it to be executed in a particular functional unit in a given cycle. The goal of an efficient schedule is to minimise the total execution time of a program by scheduling instructions in such a way as to maximise the use of the available hardware resources. This must be accomplished without violating data dependences among instructions, i.e. the program semantics. A data dependence from instruction A to instruction B means that A produces a value that must be used by B. A is referred to as a predecessor instruction or producer instruction and B is referred to as a successor instruction or consumer instruction.

In a VLIW or other parallel processor the plurality of individual execution units can be used to provide a so-called software pipeline made up of a plurality of individual stages. The concept is similar to a hardware pipeline in that successive loop iterations start before previous ones have completed. However, each software pipeline stage has no fixed physical correspondence to particular execution units.

Instead, when a loop structure in an application program is compiled the machine instructions which make up an individual iteration of the loop are scheduled for execution by the different execution units in accordance with a software pipeline schedule. This schedule is divided up into successive stages and the instructions are scheduled in such a way as to permit a plurality of iterations to be carried out in overlapping manner by the different execution units with a selected loop initiation interval (II) between the initiation of successive iterations. Thus, when a first stage of an iteration i terminates and that iteration enters a second stage, execution of the next iteration i+1 is initiated in a first stage of the iteration i+1. Thus instructions in the first stage of iteration i+1 are executed in parallel with execution of instructions in the second stage of iteration i, taking advantage of the available hardware parallelism.

Compiling methods for processors using software pipelining have to deal with machine resource constraints and data dependences among operations in the loop body. Generating optimal schedules of loops with arbitrary data dependence graphs is known to be a non-polynominal (NP)-complete problem. Because execution time is often dominated by loop structures, solutions to this scheduling problem are strongly desired.

In view of the complexity of the scheduling problem, most compiling methods capable of implementing software pipelining that are of practical use must rely on heuristics (learning by experimenting or "trial and error" to produce optimised solutions. One class of such compiling methods, referred to as modulo scheduling methods, targets innermost loops. A basic schedule of one single iteration is generated, which is issued at fixed intervals (the initiation interval (II). The basic schedule is structured in order to preserve data dependences among operations, even if the initiation interval is much smaller than the basic schedule length. During the steady state a new iteration starts and another one finishes every II cycles. Further details of one modulo scheduling method are given in our co-pending United Kingdom patent application publication no. GB-A-2355094, the entire content of which is incorporated herein by reference.

Most of the known modulo scheduling methods are intended to compile for a target processor which has a number of functional units connected to a single register file and in which the functional units have unconstrained connectivity, i.e. all of the data stored in the register file is accessible by each of the functional units. However, some processors adopt a so-called clustered architecture in which a register file is partitioned into separate register files around which small groups of functional units are clustered. The present applicants' Opus architecture is one example of such a clustered architecture. The partitioning of register files enables the clustered architecture to support scalable instruction-level parallelism by implementing processor cores with differing numbers of clusters. In the Opus architecture each cluster contains two functional units (execution units), both connected to local register files. Data communication among clusters is only possible between adjacent clusters, which creates a bi-directional ring of clusters.

A preferred compiling method for such a clustered processor is a distributed modulo scheduling (DMS) method which is capable of dealing with distributed functional units and register files. A key feature of DMS methods is the ability to perform in a single phase both scheduling of operations and data distribution among cluster and register files. Further information on DMS methods can be found, for example, in "Distributed modulo scheduling"≡, M Fernandes, J Llosa, N Topham, $5^{th}$ International Symposium on High Performance Computer Architecture, Orlando, USA, January 1999 and "A clustered VLIW architecture based on queue register files"≡, M Fernandes, PhD thesis, Edinburgh University, January 1999.

The input to a DMS method is a data dependence graph (DDG) which represents the data dependences among the VLIW instructions of the innermost loop body and surrounding code. The loop body and surrounding code together form a VLIW section. Operations are scheduled based on the availability of machine resources and on data dependences with direct predecessors in the data dependence graph. A communication constraint occurs when the output operand produced by a predecessor instruction (producer instruction) cannot be read directly by a successor instruction (consumer instruction) being scheduled. One cause of such a communication constraint is the target processor architecture, for example the clustered organisation with its distributed register files.

Although the data distribution mechanisms embodied in DMS methods always try to avoid communication constraints, this is not always possible. When a communication constraint arises, there is a gap between the producer and consumer instructions concerned. In that case, the method must schedule one or more additional "move" instructions to bring the required data to a register file where it can be read by the consumer instruction being scheduled. These one or more move instructions are referred to as an availability chain.

Although an availability chain can overcome a communication constraint, it may also compromise the overall efficiency of the resulting schedule, as inevitably hardware resources are used to execute the move instructions, rather than to execute instructions from the original application program.

Accordingly, it is desirable to provide compiling methods capable of dealing efficiently with communication constraints that can arise in relation to processors with distributed functional units and/or register files.

SUMMARY OF THE INVENTION

According to a first aspect of the present invention there is provided a compiling method for converting a source program into a corresponding object program to be executed by a processor having a plurality of execution units operable in parallel. The method is carried out by electronic data processing apparatus and comprises the steps of: (a) creating a first availability chain from a producer instruction, scheduled for execution by a first one of the execution units, to a first consumer instruction, scheduled for execution by a second one of the execution units and requiring a value produced by said producer instruction, said first availability chain comprising at least one move instruction for moving the required value from a first point accessible by said first execution unit to a second point accessible by said second execution unit; and (b) when a second consumer instruction, also requiring said value, is scheduled for execution by an execution unit other than said first execution unit, reusing at least part of said first availability chain to move the required value to a point accessible by that other execution unit.

Preferably in step (b) if there is no point on said first availability chain that is already accessible by said other execution unit, a second availability chain, comprising at least one move instruction, is created, starting from a point on said first availability chain that is closer than said first point to said point accessible by said other execution unit.

According to a second aspect of the present invention there is provided an object program for execution by a processor having a plurality of execution units operable in parallel. The object program comprises a producer instruction scheduled for execution by a first one of the execution units; first and second consumer instructions, each scheduled for execution by an execution unit other than said first execution unit and each requiring a value produced by said producer instruction; and a first availability chain comprising at least one move instruction for moving the required value from a first point accessible by said first execution unit to a second point accessible by the execution unit scheduled to execute said first consumer instruction, at least part of said first availability chain also being used to move the required value to a point accessible by the execution unit scheduled to execute said second consumer instruction.

The program may further comprise a second availability chain, comprising at least one move instruction, and starting from a point on said first availability chain that is closer than said first point to said point accessible by the execution unit scheduled to execute said second consumer instruction.

According to a third aspect of the present invention there is provided a compiling method for converting a source program into a corresponding object program to be executed by a processor having a plurality of execution units operable in parallel. The object program includes a loop kernel block and a basic block preceding said loop kernel block, and the basic block includes a producer instruction and the loop kernel block includes a consumer instruction requiring a value produced by said producer instruction. The method is carried out by electronic data processing apparatus and comprises the steps of: (a) scheduling the instructions of the loop kernel block, including scheduling said consumer instruction for execution by a first one of the execution units; and (b) after step (a) scheduling the instructions of the basic block, including scheduling said producer instruction for execution by a second one of the execution units, and also including scheduling at least one move instruction to create an availability chain within said basic block for moving the required value to a first point accessible by said consumer instruction from a second point accessible by said producer instruction.

According to a fourth aspect of the present invention there is provided an object program for execution by a processor having a plurality of execution units operable in parallel. The object program comprises: a loop kernel block; a basic block preceding said loop kernel block; wherein said basic block includes a producer instruction and said loop kernel block includes a consumer instruction requiring a value produced by said producer instruction; said consumer instruction and said producer instruction are scheduled for execution in first and second ones of the execution units respectively; and said basic block includes an availability chain comprising at least one move instruction for moving the required value to a first point accessible by said consumer instruction from a second point accessible by said producer instruction.

According to a fifth aspect of the present invention there is provided a compiling method for converting a source program into a corresponding object program to be executed by a processor having a plurality of execution units operable in parallel. The object program includes a loop kernel block and a basic block preceding said loop kernel block, and the basic block includes a producer instruction and the loop kernel block includes a consumer instruction requiring a value produced by said producer instruction. The method is carried out by electronic data processing apparatus and comprises the steps of: (a) scheduling the instructions of the loop kernel block, including scheduling said consumer instruction for execution by a first one of the execution units; and (b) after step (a) scheduling the instructions of the basic block, including selecting, in dependence upon the scheduling in step (a) of said consumer instruction for execution by said first execution unit, one of the plurality of execution units to execute said producer instruction and scheduling said producer instruction for execution by the selected execution unit.

Compiling methods embodying the invention are carried out by electronic data processing apparatus such as a general-purpose computer operating according to a computer program. Thus, according to further aspects of the present invention, there are provided computer programs which, when run on a computer, cause the computer to carry out compiling methods embodying the aforesaid first, third and fifth aspects of the invention.

For example a sixth aspect of the present invention can provide a computer program which, when run on a computer, causes the computer to carry out a compiling method for converting a source program into a corresponding object program to be executed by a processor having a plurality of execution units operable in parallel. The computer program comprises code portions for: (a) creating a first availability chain from a producer instruction, scheduled for execution by a first one of the execution units, to a first consumer instruction, scheduled for execution by a second one of the execution units and requiring a value produced by said producer instruction, said first availability chain comprising at least one move instruction for moving the required value from a first point accessible by said first execution unit to a second point accessible by second execution unit; and (b) when a second consumer instruction, also requiring said value, is scheduled for execution by an execution unit other than said first execution unit, reusing at least part of said first availability chain to move the required value to a point accessible by that other execution unit.

A seventh aspect of the present invention can provide a computer program which, when run on a computer, causes the computer to carry out a compiling method for converting a source program into a corresponding object program to be executed by a processor having a plurality of execution units operable in parallel. The object program includes a loop kernel block and a basic block preceding said loop kernel block, and the basic block includes a producer instruction and the loop kernel block includes a consumer instruction requiring a value produced by said producer instruction. The computer program comprises code portions for: (a) scheduling the instructions of the loop kernel block, including scheduling said consumer instruction for execution by a first one of the execution units; and (b) after step (a) scheduling the instructions of the basic block, including scheduling said producer instruction for execution by a second one of the execution units, and also including scheduling at least one move instruction to create an availability chain within said basic block for moving the required value to a first point accessible by said consumer instruction from a second point accessible by said producer instruction.

An eighth aspect of the present invention can provide a computer program which, when run on a computer, causes the computer to carry out a compiling method for converting a source program into a corresponding object program to be executed by a processor having a plurality of execution units operable in parallel. The object program includes a loop kernel block and a basic block preceding said loop kernel block, and the basic block includes a producer instruction and the loop kernel block includes a consumer instruction requiring a value produced by said producer instruction. The computer program comprises code portions for: (a) scheduling the instructions of the loop kernel block, including scheduling said consumer instruction for execution by a first one of the execution units; and (b) after step (a) scheduling the instructions of the basic block, including selecting, in dependence upon the scheduling in step (a) of said consumer instruction for execution by said first execution unit, one of the plurality of execution units to execute said producer instruction and scheduling said producer instruction for execution by the selected execution unit.

Similarly, further aspects of the present invention can provide compiling apparatus such as a general-purpose computer operating according to a program, for example a program embodying the aforesaid sixth, seventh or eighth aspect of the present invention.

For example, a ninth aspect of the present invention can provide compiling apparatus for converting a source program into a corresponding object program to be executed by a processor having a plurality of execution units operable in parallel. The apparatus comprises: a creating unit which creates a first availability chain from a producer instruction, scheduled for execution by a first one of the execution units, to a first consumer instruction, scheduled for execution by a second one of the execution units and requiring a value produced by said producer instruction, said first availability chain comprising at least one move instruction for moving the required value from a point accessible by said first execution unit to a second point accessible by said second execution unit; and a reusing unit operable, when a second consumer instruction, also requiring said value, is scheduled for execution by an execution unit other than said first execution unit, to reuse at least part of said first availability chain to move the required value to a point accessible by that other execution unit.

A tenth aspect of the present invention can provide compiling apparatus, for converting a source program into a corresponding object program to be executed by a processor having a plurality of execution units operable in parallel. The object program includes a loop kernel block and a basic block preceding said loop kernel block, and the basic block includes a producer instruction and the loop kernel block includes a consumer instruction requiring a value produced by said producer instruction. The apparatus comprises: a loop kernel block scheduling unit which schedules the instructions of the loop kernel block and which is operable to schedule said consumer instruction for execution in a first one of the execution units; and a block block scheduling unit which schedules the instructions of said basic block after said scheduling of the loop-kernel-block instructions and which is operable to schedule said producer instruction for execution in a second one of the execution units and further operable to schedule at least one move instruction so as to create an availability chain within said basic block for moving the required value to a first point accessible by said consumer instruction from a second point accessible by said producer instruction.

An eleventh aspect of the present invention can provide compiling apparatus for converting a source program into a corresponding object program to be executed by a processor having a plurality of execution units operable in parallel. The object program includes a loop kernel block and a basic block preceding said loop kernel block, and the basic block includes a producer instruction and the loop kernel block includes a consumer instruction requiring a value produced by said producer instruction. The apparatus comprises: a loop kernel block scheduling unit which schedules the instructions of the loop kernel block and which is operable to schedule said consumer instruction for execution in a first one of the execution units; and a basic block scheduling unit which schedules the instructions of said basic block after said scheduling of the loop-kernel-block instructions and which is operable to select, in dependence upon the scheduling of said consumer instruction for execution by said first execution unit, one of the plurality of execution units to execute said producer instruction and which is further operable to schedule said producer instruction for execution by the selected execution unit.

A twelfth aspect of the present invention can provide a processor comprising a plurality of execution units operable in parallel and which executes, when in use, an object program embodying the aforesaid second or fourth aspect of the present invention.

In one processor embodying the invention the execution units of the processor are arranged in a predetermined configuration and each execution unit is provided with means for transferring said required value to only a limited subset of the other execution units. For example, said execution units may be arranged in a ring configuration and each execution unit may have means for moving said required value only to a neighbouring one of said execution units in said ring configuration. In this case the or each said availability chain includes one such move instruction for each move of said required value from a point (e.g. register file) accessible by one execution limit to another point accessible by another execution unit.

According to a thirteenth aspect of the present invention there is provided processing apparatus comprising: a memory storing an object program embodying the aforesaid second or fourth aspect of the present invention and a processor, connected operatively to said memory and having a plurality of execution units operable in parallel, for executing said object program. Such processing apparatus may be a "system-on-chips" (SOC) for use in multimedia applications, network routers, video mobile phones, intelligent automobiles, digital television, voice recognition, 3D games, etc.

Reference will now be made, by way of example, to the accompanying drawings.

DESCRIPTION OF THE PREFERRED EMBODIMENTS

Figure 1:
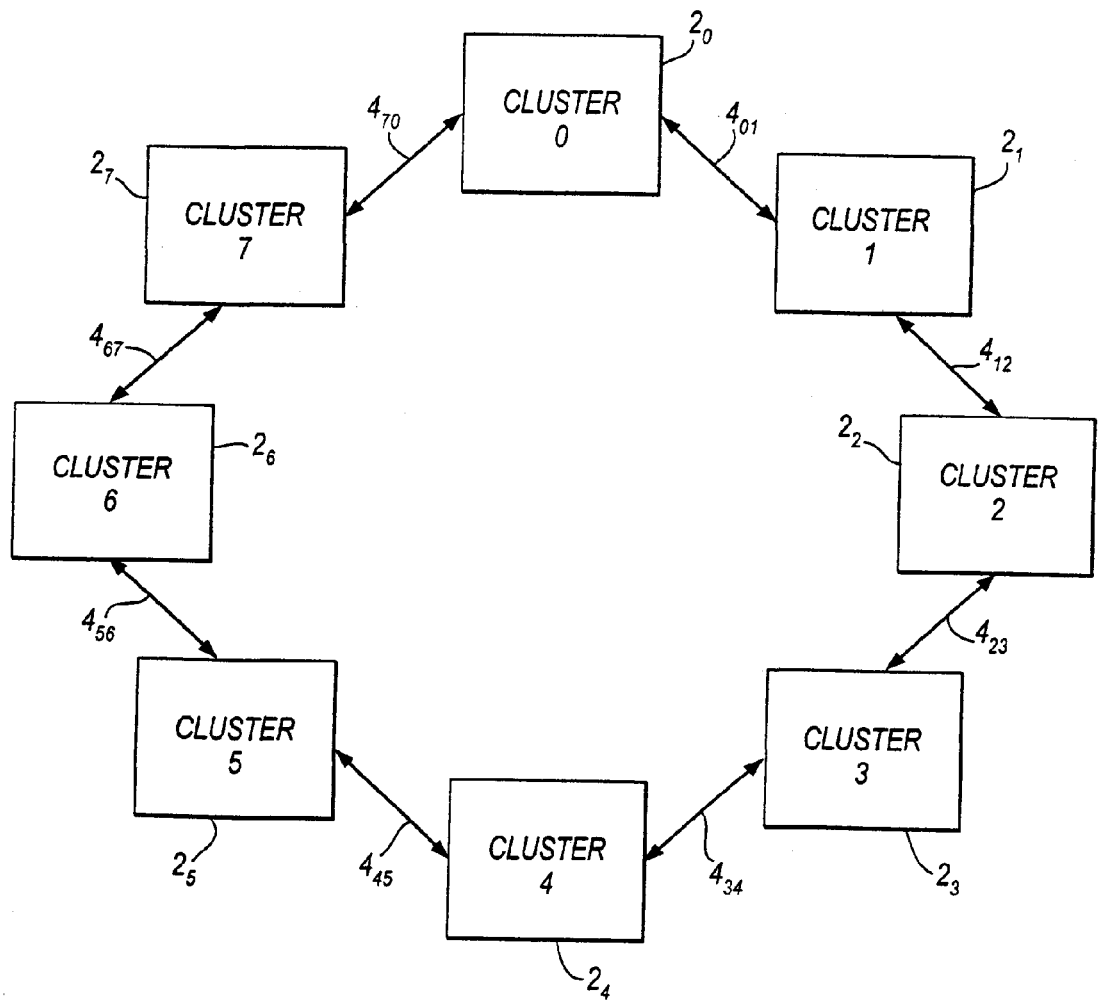
FIG. 1 is a schematic view of a processor having a clustered architecture.

The processor shown in FIG. 1 has a clustered architecture and comprises eight individual clusters (cluster 0 to cluster 7) $2_0$ to $2_7$. Each cluster has a bi-directional inter-cluster data transfer path 4 with its two neighbouring clusters. For example, cluster 0 is connected by path $4_{01}$ to cluster 1 and is connected by path $4_{70}$ to cluster 7. Thus, the clusters $2_0$ to $2_7$ are connected in a bi-directional ring configuration.

In the FIG. 1 processor, one of the clusters, for example cluster 0, is a master cluster and the remaining clusters are slave clusters. When the processor is in scalar mode instructions are issued to the master cluster alone; effectively it behaves as a regular microprocessor. When the processor is in VLIW mode a packet containing two instructions for each cluster is issued in parallel to all clusters. The instructions in each packet are distinct, permitting each cluster to compute independent operations.

Figure 2:
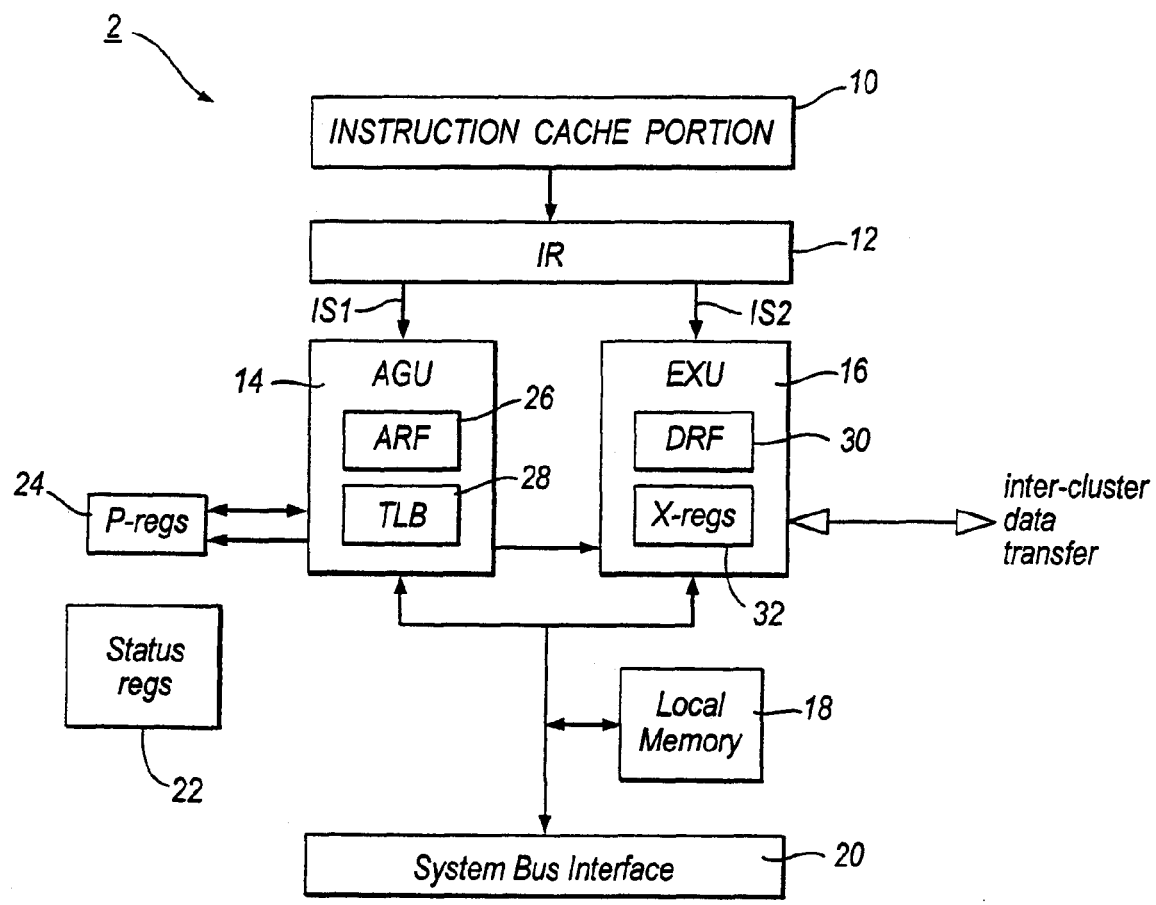
FIG. 2 is a block diagram showing parts of one cluster in the FIG. 1 processor.

FIG. 2 shows parts of one of the slave clusters 2 in the FIG. 1 processor. The cluster comprises an instruction cache portion 10, an instruction register 12 having first and second issue slots IS1 and IS2, an address generation unit (AGU) 14, an execution unit (EXU) 16, a local memory 18, a system bus interface unit 20, status registers 22 and predicate registers 24. The master cluster is generally similar in constitution but contains additional elements such as a control transfer unit which executes all control transfer instructions including branches, subroutine call/return and returns from exceptions.

When the processor is operating in VLIW mode the respective instruction cache portions 10 in the different clusters together constitute an instruction cache for caching VLIW instruction packets. Within each cluster the instruction cache portion 10 caches only the instructions to be executed by the cluster concerned. Instructions are fetched from the instruction cache portion 10 and placed in the instruction register 12. In VLIW mode the instruction register 12 holds one "wide" instruction packet containing two VLIW instructions which are executed strictly in parallel. The first of these two instructions, issued from issue slot IS1, is an addressing computation and the second instruction, issued from issue slot IS2, is a data computation.

The addressing computation is carried out by the address generation unit 14. The address generation unit 14 comprises an address register file (ARF) 26 and (if the processor has a virtual memory facility) a translation lookaside buffer (TLB) 28. The TLB 28 maps virtual addresses to physical addresses, as well as enforcing page-level access permissions. The address register file 26 comprises a plurality of address registers which are used for storing operands used in the address computations carried out by the AGU 14.

The execution unit 16 carries out data computations for the cluster. The execution unit 16 comprises a data register file (DRF) 30 which has a plurality of data registers which store operands used in the data computations. The execution unit 16 further comprises exception registers 32. When a cluster wishes to raise an exception its exception registers 32 contain bits which indicate the reasons for that exception.

The local memory 18 within each cluster is accessible by the address generation unit 14 and the execution unit 16 and can be loaded under direct memory access (DMA) control from an external DMA device attached to the system bus. The system bus is accessible by the units 14 and 16 using the system bus interface unit 20.

The status registers 22 in each cluster are used for storing various items of status information for the cluster, for example arithmetic status information. The predicate registers 24 are used for controlling predicated execution of instructions, for controlling execution of software pipelined loops and for converting control dependencies into data dependencies.

In VLIW mode the data register file 30 in each cluster is extended to give the cluster read-only access to a portion of the data register file in each direct-neighbour cluster. For example, each cluster may have access to a maximum of 16 data values within each of its two direct neighbours.

This enables an execution unit in a first cluster to write a data value in its own data register file and an execution unit in a second cluster which directly neighbours the first cluster to read that data value from the data register file of the first cluster. The read value may then be written in the data register file (or address register file) of the second cluster.

Figure 3:
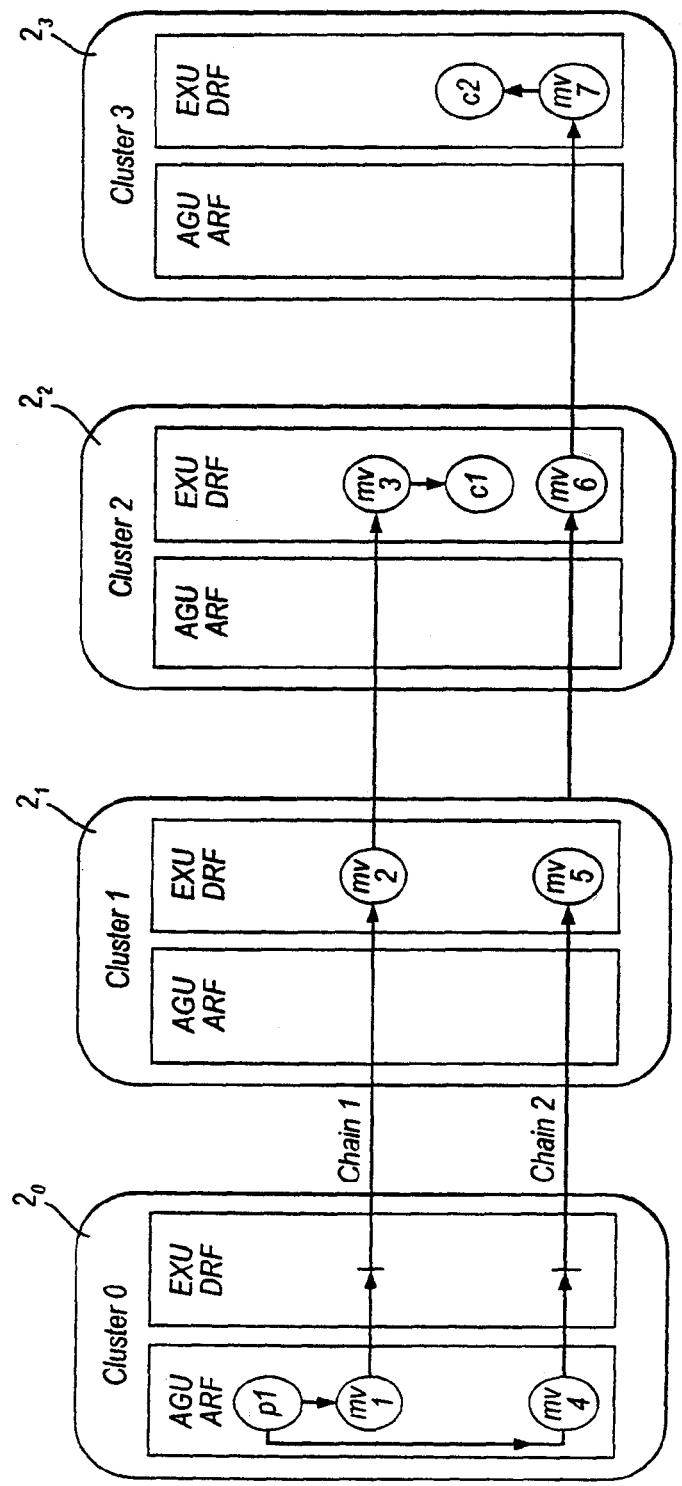
FIG. 3 is a schematic view for use in explaining a conventional compiling method.

Before describing preferred embodiments of the present invention, a first problem which can arise in a conventional DMS method will be described with reference to FIG. 3. FIG. 3 shows schematically four clusters $2_0$ to $2_3$ of the FIG. 1 processor. In FIG. 3 p1 denotes a producer instruction (predecessor instruction) and c1 and c2 denote respectively first and second consumer instructions (successor instructions) each requiring a value (output operand) produced by the instruction p1. Taking account of the availability of machine resources and data dependences the conventional DMS method schedules the producer instruction to be executed by the AGU in cluster 0, the consumer instruction c1 to be executed by the EXU in cluster 2 and the consumer instruction c2 to be executed by the EXU in cluster 3. In this case, communication constraints occur in the processor because the output operand produced by the producer instruction p1 cannot be read directly by the consumer instructions c1 and c2 being scheduled since clusters 2 and 3 have no access to the ARF in cluster 0 where the output operand of the instruction p1 is held.

To deal with each communication constraint the conventional DMS method schedules additional "move" instructions, denoted by my in FIG. 3, to bring the required data to a register file where it can be read by the instruction being scheduled. Thus, when the instruction c1 is being scheduled the conventional DMS method schedules three additional my instructions mv1, mv2 and mv3 to move the output operand of the instruction p1 in stages from the ARF in cluster 0 to the DRF in cluster 2. The first move instruction mv1 is an intra-cluster move which moves the operand from the ARF in cluster 0 to the DRF in the same cluster. From there the operand is moved, in an inter-cluster transfer brought about by the second move instruction mv2, to the DRF of cluster 1, from where it is moved by a further inter-cluster transfer (mv3) to the DRF of cluster 2. The series of move instructions mv1 to mv3 constitute a first availability chain in FIG. 3.

After scheduling the instruction c1 in this way, the conventional DMS algorithm comes to schedule the instruction c2. This scheduling is carried out independently of the scheduling for the instruction c1 and therefore involves scheduling an additional four move instructions mv4 to mv7 to bring the operand from the ARF in cluster 0 to the DRF in cluster 3. These four additional move instructions constitute a second availability chain in FIG. 3.

Hardware resources are used to execute move instructions and effectively the additional move instructions needed for the availability chains in FIG. 3 occupy issue slots which would otherwise be available for the scheduling of instructions belonging to the original program to be compiled. If the instructions p1, c1 and c2 form part of a loop body, the additional execution time resulting from the availability chains can seriously degrade processor performance.

Figure 4:
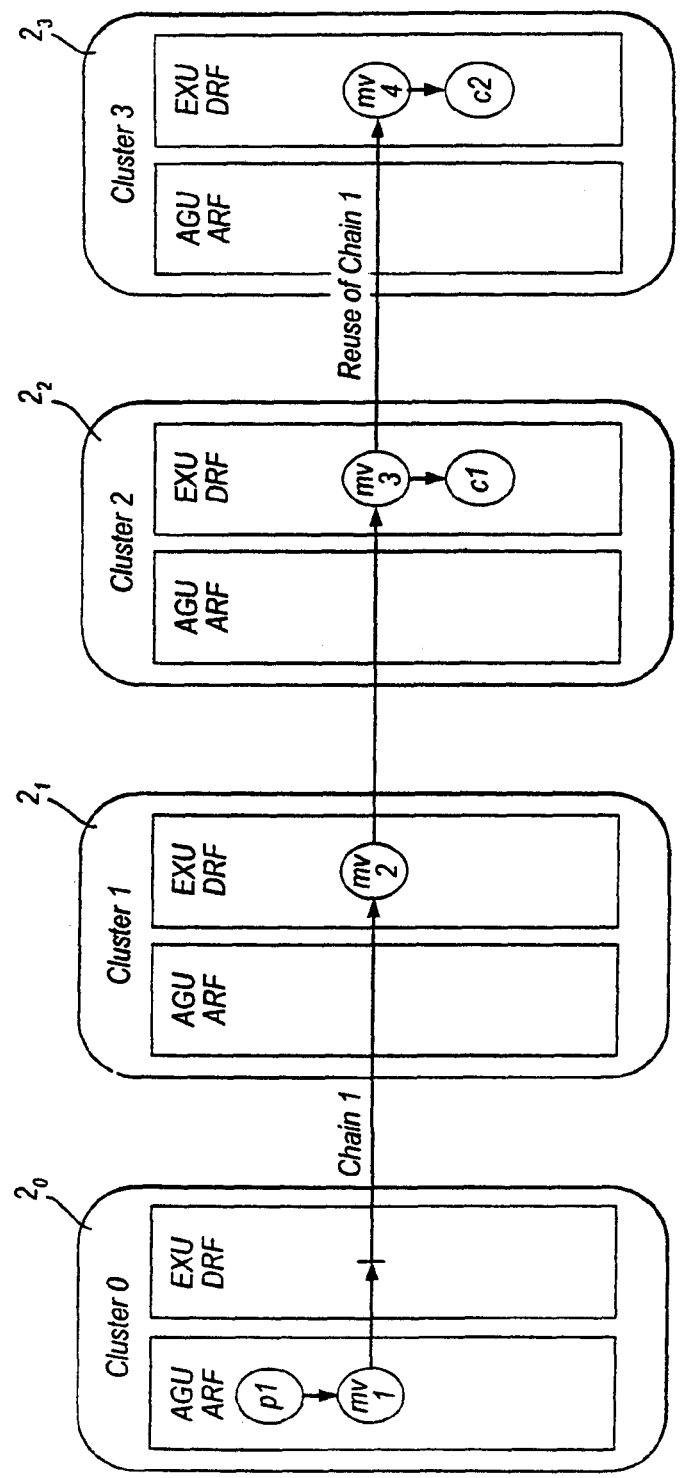
FIG. 4 is a schematic view, corresponding to FIG. 3, for use in explaining a compiling method embodying one aspect of the present invention.

FIG. 4 shows how a compiling method according to a first aspect of the present invention deals with the scheduling of the same three instructions p1, c1 and c2. The scheduling for instruction c1 is carried out in the same way as in FIG. 3, so that a first availability chain made up of move instructions mv1, mv2 and mv3 is formed. When the FIG. 4 method comes to schedule the instruction c2, however, rather than create a new availability chain as in FIG. 3 to resolve the communication constraint between instructions p1 and c2, the method reuses the existing first availability chain. The FIG. 4 method finds the closest point on the existing availability chain to cluster 3, which is the DRF of cluster 2. In this example it therefore chooses to reuse the existing first availability chain (mv1 to mv3) in its entirety and to start a new availability chain (second availability chain) from the DRF in cluster 2. This second availability chain involves only a single additional move instruction mv4 to carry out an inter-cluster transfer from the DRF of cluster 2 to the DRF of cluster 3.

In FIG. 4, because of the reuse of the first availability chain when scheduling instruction c2, the second availability chain is much shorter so that, in comparison with FIG. 3, three move instructions are saved, making the slots for those move instructions available for the scheduling of other instructions belonging to the original program.

Although in this example the second availability chain starts from the end of the first availability chain a new availability chain can start from any point of an existing one.

It may also be that by reusing an existing availability chain no new availability chain is required at all. For example, if the instruction c2 were scheduled in cluster 1 the required operand would already be present in the DRF of cluster 1 as a result of the move instruction mv2 of the existing availability chain 1.

In order to obtain an efficient realisation of the FIG. 4 method it is desirable to be able to search efficiently for the best point of availability of a required value (operand) amongst the existing availability chains. Conventional compiling methods assume that a value used by a consumer instruction is taken from the original producer instruction which produced that value. This guarantees that the correct source of the value is used. The same is also true when an availability chain is created for the first time, as the most recently scheduled move instruction becomes the new original source. However, it is necessary to exercise some care when trying to reuse an existing availability chain, as it must be ensured that the value is taken from a point where it has not been changed since it was first generated by the original instruction. This requires a mechanism that searches through the partial schedule, i.e. the instructions of the program that have been scheduled so far. The instructions in the partial schedule for a VLIW processor can be examined to know precisely when (i.e. in which cycle) and where (i.e. in which cluster and register file) a given data value is available. The search through the partial schedule considers all possible points of availability where the value has not been changed. By limiting the search to those points not only is the use of the correct value ensured but also an unnecessary large search space can be avoided.

The searching mechanism also advantageously makes use of a data dependence graph which represents the individual machine instructions and their dependence relationships. In the data dependence graph an edge pointing from a first instruction to a second instruction indicates that the second instruction is dependent upon the result of execution of the first instruction. An example of a data dependence graph is given in FIG. 3 of GB-A-2355094.

A preferred searching method for use when a communication conflict is detected during compiling has the following basic steps.

In the initial state data (a required value) is located in a source register file (ARF or DRF) and has to be made available in a target register file (ARF or DRF).

If both the source and target register files are located in the same cluster, the search checks the partial schedule for an existing move instruction internal to that cluster (intra-cluster move). The relevant intra-cluster moves in this context can only be one of the following: md2a (move data from DRF to ARF), or ma2d (move data from ARF to DRF).

If the source and target registers are located in different clusters, the search checks the partial schedule for existing move instructions between those clusters (inter-cluster moves). Inter-cluster moves can only take place between DRFs, so the only instructions to be searched for are md2d instructions.

Starting from the source register file, the search looks for the closest intra-cluster or inter-cluster move to the target register file. Here, the closest move is the one that would require the least (possibly 0) additional moves to take the data to the target register file. The search is guided using the data dependence graph in which data dependent instructions are interconnected by means of edges. As the search moves from the source register file to each new access point (register file) it is also necessary to check at each stage that the data moved into that access point file by a move instruction has not been modified by another instruction that will be executed after that move instruction. If it has, the data at that point is useless and the ability to reuse the availability chain from that point onwards is lost.

When data is moved between different clusters, the search must also consider all possible routes between clusters, and these are in turn dependent on the connectivity between the clusters. In the case of the FIG. 1 processor there are only two possible routes between source and target clusters: one from left to right (clockwise in FIG. 1) and the other from right to left (anticlockwise in FIG. 1). Those are the only possible routes to move data as the clusters are interconnected in a bi-directional ring topology. Because the number of possible routes is small in the architecture, the search can be carried out efficiently.

Figure 5:
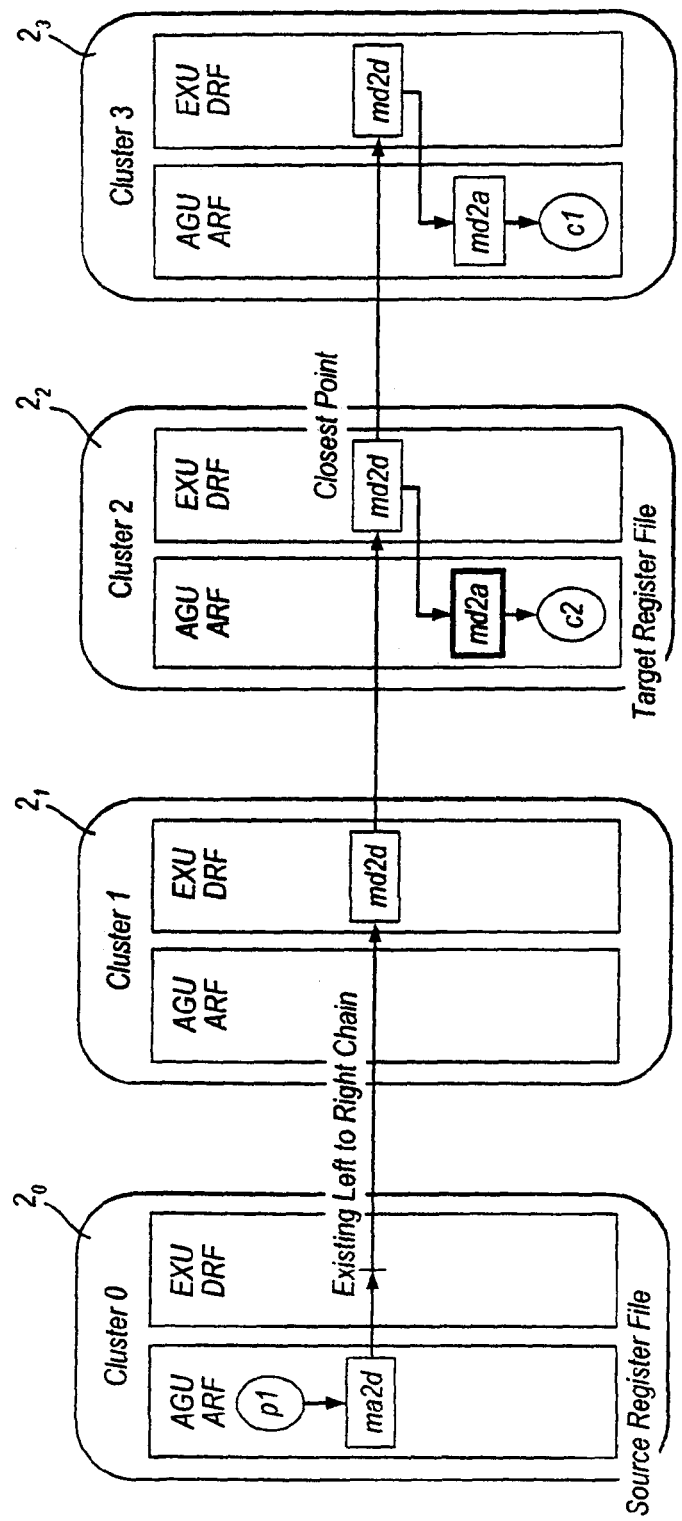
FIG. 5 shows a schematic view for use in explaining a search operation carried out in the FIG. 4 compiling method.

FIG. 5 shows an example of the search operation described above. In this example the instructions p1 and c1 have already been scheduled and the instruction c2 is being scheduled. Instruction c2 is to be executed in the ARF of cluster 2. Thus, the source register file is the ARF in cluster 0 and the target register file is the ARF in cluster 2. The search therefore starts from the ARF in cluster 0 and finds that there is an existing left-to-right availability chain starting from the ARF of cluster 0. The search finds in succession the move instructions ma2d scheduled in the AGU of cluster 0, md2d scheduled in the EXU of cluster 1, and md2d scheduled in the EXU of cluster 2. The value at each point along the search is checked to see if it has been modified by another instruction. The search stops at md2d scheduled in the EXU of cluster 2 because this is the location of instruction c2 and so must be the closest point on the existing availability chain. In this case, the closest point along the existing chain is another register file within the same cluster as the target register file, so a new availability chain is simply created from the DRF in cluster 2 to the ARF in cluster 2 by scheduling a single additional intra-cluster move instruction md2a in the AGU of cluster 2.

In this example, there is no existing right-to-left chain from cluster 0 to other clusters but, if there were, the search would also take account of this chain when looking for the closest availability point.

Another preferred feature of a compiling method embodying the present invention is the capability of unscheduling previously-scheduled instructions, in order to break dead-end states that can be overcome if one or more previously-scheduled instructions are rescheduled elsewhere. When such rescheduling is carried out it is possible that an availability chain becomes redundant if the associated producer or consumer instruction is unscheduled. Efficient ways of unscheduling such a redundant chain (or part of one) will now be described.

When an original producer instruction is unscheduled, all move instructions directly or indirectly dependent on it in an availability chain are also unscheduled. For example, referring back to FIG. 5, if the producer instruction p1 is unscheduled all of the move instructions in FIG. 5 will also be unscheduled. This can be carried out using the following search operation which again is advantageously guided using the edges in a data dependence graph.

The search starts with the original producer instruction that is being unscheduled. The data dependence graph is then traversed starting from the first edge leaving from the initial point (original producer instruction). Every move instruction (md2a, ma2d, md2d) found in the traversing process is unscheduled and removed from the data dependence graph.

The traversing process ends when an instruction other than a move instruction is found. The search then returns to the initial point to carry out another traversing process starting from the next edge (if any) leaving from the initial point.

A different search operation is carried out to unschedule an original consumer instruction. In this case, only those move instructions which are used exclusively to transfer data to the consumer instruction to be unscheduled should themselves be unscheduled. The search operation proceeds as follows.

The initial point in the search is the original consumer instruction in the data dependence graph. The data dependence graph is then traversed starting from the first edge arriving at the initial point. Each move instruction found in the traversing process is checked to determine if it has no other successor instruction apart from the consumer instruction being unscheduled. If there is no other successor the move instruction is unscheduled and removed from the data dependence graph. If, however, there is another successor instruction apart from the move instruction being unscheduled the move instruction concerned cannot be unscheduled and is retained in the data dependence graph.

The traversing process ends when an instruction other than a move instruction is found. The search then returns to the initial point and carries out another traversing process starting from the next edge (if any) arriving at the initial point.

Figure 6:
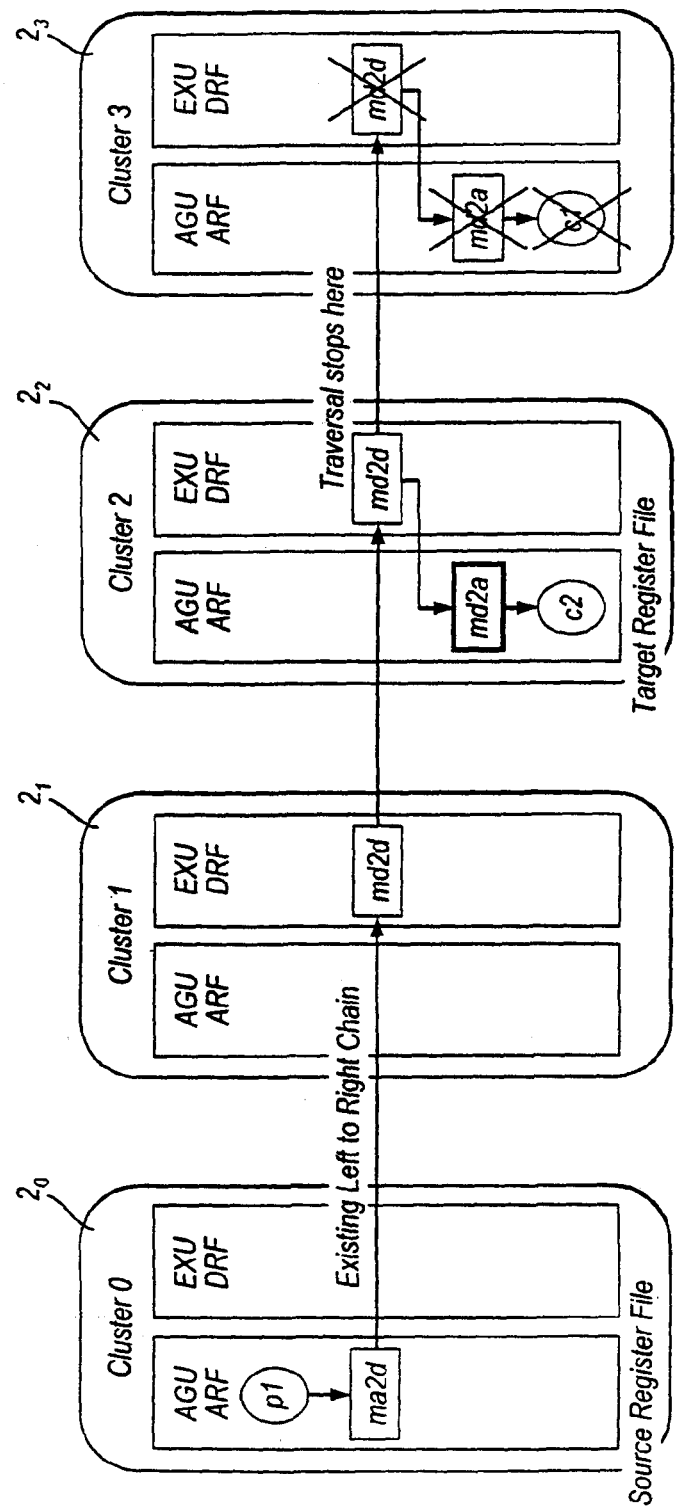
FIG. 6 is a schematic view for use in explaining an unscheduling operation carried out in the FIG. 4 compiling method.

FIG. 6 shows an example in which the consumer instruction c1 in FIG. 5 is to be unscheduled. The initial point of the search is the consumer instruction c1. The instructions md2a and md2d scheduled in cluster 3 are unscheduled as they have no other successor instructions in this example. However, when the traversing process reaches the md2d instruction scheduled in cluster 2 it is found that that instruction has a successor instruction md2a and so may not be unscheduled. Accordingly, as shown in FIG. 6, only part of the availability chain between the instructions p1 and c1 is unscheduled.

As described above a compiling method embodying the first aspect of the invention has the following advantages. Firstly, it breaks the direct dependence between source and target instructions and enables another dependence to be created between some point of an existing availability chain and the target instruction. Secondly, the search for a suitable availability point on an existing chain, and/or the removal of all or part of a chain once it becomes redundant, can be carried out efficiently.

Figure 7:
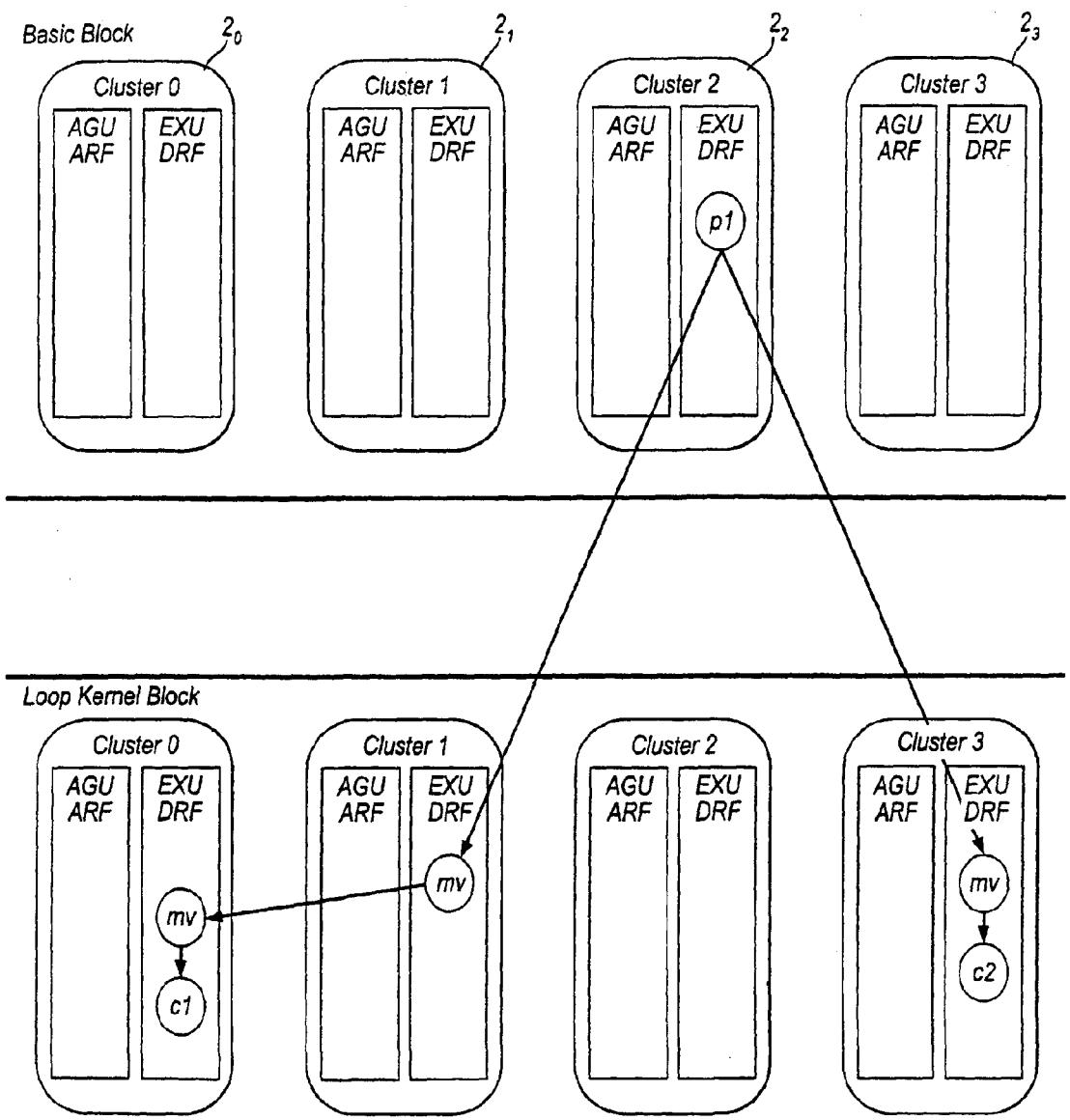
FIG. 7 is a schematic view for use in explaining how live-ins within a loop kernel are handled by a conventional compiling method.

Next, compiling methods embodying third and fifth aspects of the present invention will be described with reference to FIGS. 7 to 9.

A modulo-scheduled innermost loop may use some values that are defined outside the loop kernel. Each such value is referred to as a live-in. A live-in is produced an instruction executed in a given cluster prior to the execution of the loop kernel. That live-in may be used by more than one consumer instruction within the loop kernel and those consumer instructions may be scheduled in any possible combination of available clusters. It will therefore often be the case that the live-in will have to be copied (using availability chains) from its source register file in the producing cluster to target register files in other clusters, so as to resolve communication constraints inherent in the processor architecture.

Conventional compiling methods subdivide a program section into a number of blocks, scheduling each block essentially independently of the other blocks. If required, additional interface blocks may be created to link the independently-scheduled original blocks, but the original blocks are not themselves altered to adapt them to the scheduling of other blocks. Convention-ally, a block of code (referred to as a basic block) preceding a loop kernel block will be scheduled before the loop kernel block is scheduled. This means, as shown in FIG. 7, that by the time the loop kernel block is scheduled an instruction p1 defining a live-in has already been scheduled in the preceding basic block. In FIG. 7, the loop kernel block contains consumer instructions c1 and c2 which are scheduled in clusters 0 and 3 respectively. Each of these consumer instructions requires the live-in value produced by the producer instruction p1 scheduled in a different cluster (cluster 2) of the basic block. For this reason two availability chains are required to move the live-in value from cluster 2 into clusters 0 and 3.

At run-time these availability chains (move instructions) are executed for each iteration of the loop, giving rise to a significant execution time penalty.

Figure 8:
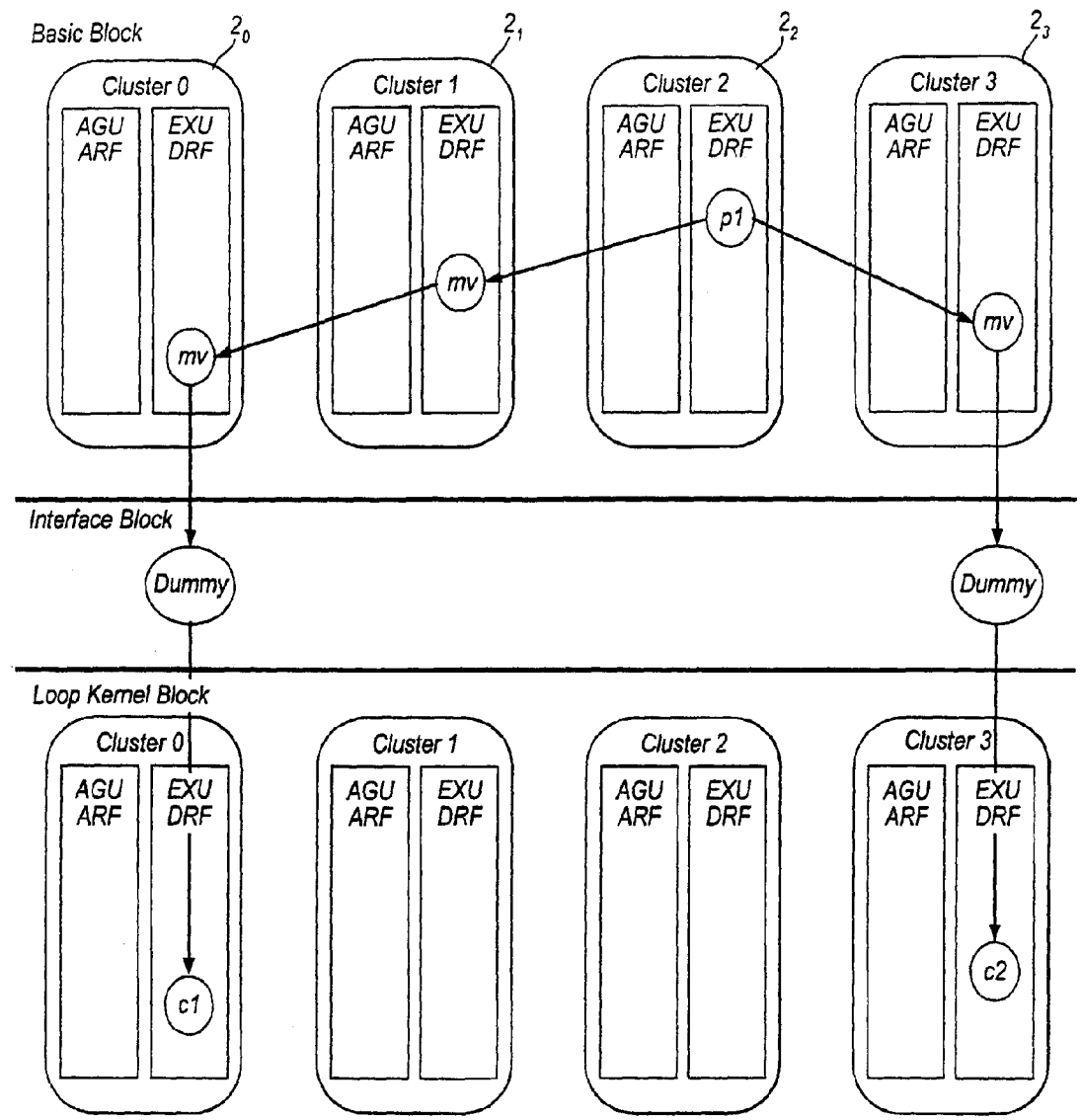
FIG. 8 is a schematic view, corresponding to FIG. 7, for use in explaining how live-ins within a loop kernel are handled by a compiling method embodying another aspect of the present invention.
Figure 9:
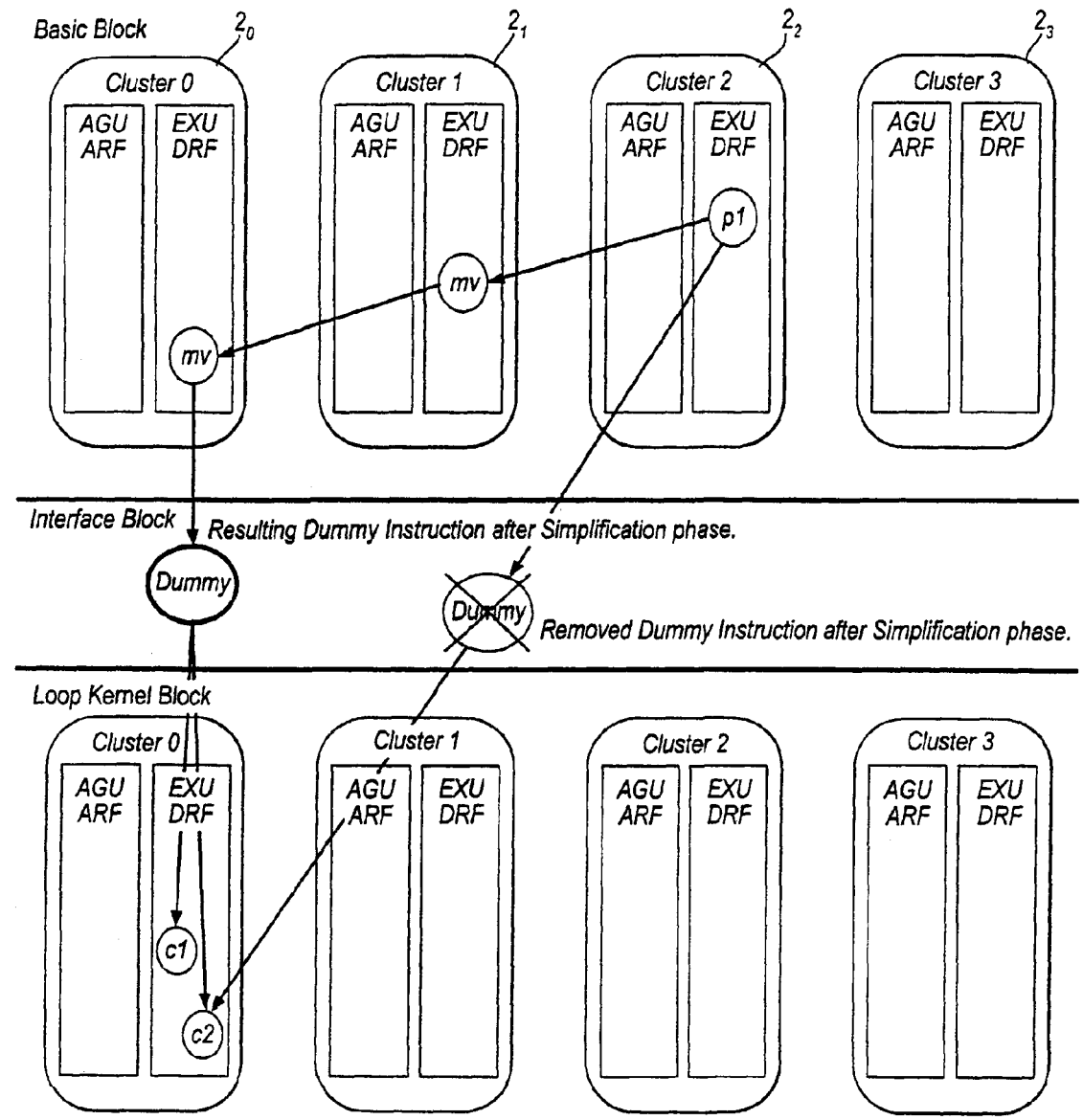
FIG. 9 is a schematic view for use in explaining a simplification operation carried out in the FIG. 8 compiling method.

FIG. 8 shows how a compiling method embodying the third aspect of the present invention deals with live-in values. In FIG. 8 the availability chains for live-ins are moved from the loop kernel block to the preceding basic block.

The FIG. 8 method schedules the blocks of code out of order and starts with the loop kernel block. Thus, the slots in which the consumer instructions c1 and c2 will be scheduled is determined before the scheduling of the basic block.

After the scheduling of the loop kernel block is completed, the basic block preceding the loop kernel block is scheduled using an interface block to guide the scheduling of the availability chains in the basic block. Initially, each consumer construction has a corresponding dummy instruction in the interface block.

That dummy instruction is scheduled in the same issue slot as its corresponding consumer instruction. Thus, a first dummy instruction in the interface block is scheduled in issue slot 2 of cluster 0, and a second dummy instruction is scheduled in slot 2 of cluster 3.

Then, when the basic block is scheduled a first availability chain is formed from the producer instruction p1 to the first dummy instruction, and a second availability chain is formed from the producer instruction p1 to the second dummy instruction.

The dummy instructions of the interface block are not actually present in the final object program and therefore do not incur any execution overhead. They are removed from the schedule after the basic block has been scheduled, and so serve only a temporary purpose during the compiling method as "flags" to guide the availability chains in the basic block.

Once the loop kernel block has been scheduled but before the basic block is scheduled it is preferable to carry out a simplification operation on the interface block to merge two or more dummy instructions into one if the consumer instructions corresponding to the dummy instructions are located in the same cluster and read from the same register file. For example, in FIG. 9 two consumer instructions c1 and c2 within the loop kernel block are both scheduled in the same cluster (cluster 0) and both read from the same register file (DRF) in that cluster. In this case, although two dummy instructions corresponding to the consumer instructions c1 and c2 respectively are initially present in the interface block, one of those two dummy instructions can be eliminated in a simplification phase carried out prior to the scheduling of the basic block. Thus, only one dummy instruction remains in the interface block by the time the basic block is scheduled, so that a single availability chain is required to move the live-in value from the DRF of cluster 2 to the DRF of cluster 0 where it can be read by both consumer instructions c1 and c2.

In a compiling method embodying the fifth aspect of the invention, because the loop kernel block is scheduled before the basic block the selection of the execution unit for the producer instruction can take account of the execution unit scheduled to execute the consumer instruction. The selected execution unit may be a closest available one of the execution units to the consumer-instruction execution unit, so that the number of move instructions required in the basic block is minimised. Preferably the selected execution unit is the consumer-instruction execution unit itself, avoiding any move instructions (availability chain) at all. Thus, in the FIG. 9 example the producer instruction p1 should preferably be scheduled in cluster 0 when scheduling of the basic block is carried out. This can be achieved using the same method as described with reference to FIG. 8, i.e. by scheduling the loop kernel block first and then "anchoring" dummy instructions corresponding to the consumer instructions c1 and c2 in cluster 0 of the interface block. In this case, the prior scheduling of the loop kernel block will result in the producer instruction p1 being guided to cluster 0, eliminating the need for any additional move instructions in the basic block.

As described above, compiling methods embodying the third and fifth aspects of the invention carry out non-sequential phase ordering in the scheduling of successive blocks of code. This increases the flexibility when scheduling the loop kernel. Preferably, dummy instructions are used to link the instructions producing a live-in to the loop kernel consumer instructions. These dummy instructions are used after the loop kernel scheduling to determine the availability chains that will be scheduled in the preceding basic block and/or to influence the scheduling of the production instruction.

Compiling methods embodying the aforesaid first, third and fifth aspects of the present invention have the technical effect of improving the performance of processors which execute the compiled object programs.

In particular, a higher execution speed of application programs can be achieved. In the aspects of the invention described with reference to FIG. 8, viable implementation of more complex application programs can be achieved without making the code contained within the loop kernel block significantly more complex simplified.

It will be appreciated by those skilled in the art that the availability chains of the present invention are analagous to physical connection paths (data transfer paths). Just as there is a technical effect in optimising the layout of physical connection paths, so also there is a technical advantage in optimising these availability chains or in eliminating unnecessary move instructions altogether. Object programs compiled by methods embodying the present invention having optimised availability chains therefore bring about new technical results when executed on a target processor.

In addition, by eliminating unnecessary move instructions, programs compiled by methods embodying the present invention are expected to produce shorter programs, requiring less memory to store the programs and achieving shorter execution times.

Although the above description relates, by way of example, to a VLIW processor capable of software-pipeline execution, it will be appreciated that compiling methods embodying the present invention are applicable to processors not having these features. Compiling methods embodying the invention can be applied to any type of block scheduling which involves availability chains. Object programs embodying the invention may be executed by any type of processor including a superscalar processor.

A processor executing an object program embodying the present invention may be included as a processor "core" in a highly-integrated "system-on-chips" (SOC) for use in multimedia applications, network routers, video mobile phones, intelligent automobiles, digital television, voice recognition, 3D games, etc.

Figure 10A:
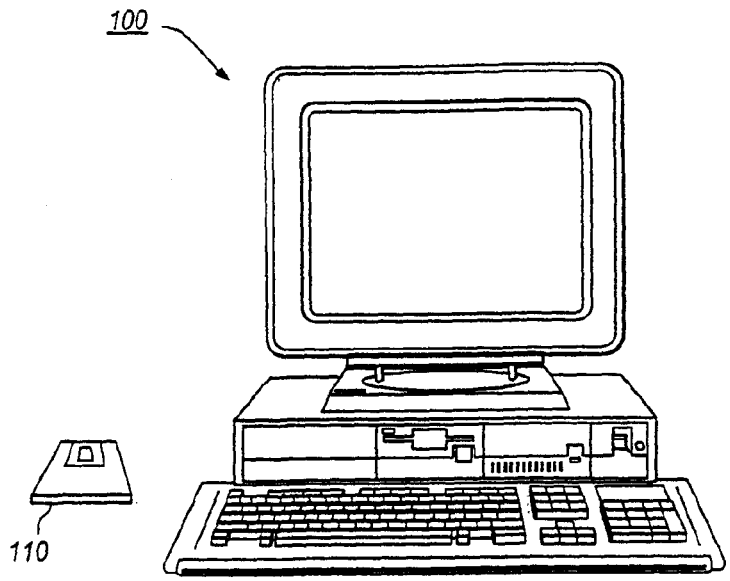
FIG. 10(A) is a schematic view of a general-purpose computer suitable for carrying out a compiling method embodying the present invention.

A compiling method embodying the present invention can be carried out by a general-purpose computer 100 operating in accordance with a computer program, for example as shown schematically in FIG. 10(A). This computer program may be carried by any suitable carrier medium such as a recording medium (e.g. floppy disk 110 or CD-ROM) or a transmission medium (e.g. signal such as a signal downloaded via a communications network such as the Internet). The appended computer program claims are to be interpreted as covering a computer program by itself or in any of the above-mentioned forms.

The same applies to an object program embodying the present invention, and the appended object program claims are to be interpreted as covering an object program by itself or in any of the above-mentioned forms (carrier medium/recording medium/transmission medium).

Compiling apparatus embodying the present invention can also be implemented by a general-purpose computer operating in accordance with a computer program, as shown in FIG. 10(A).

Figures 10B, 10C:
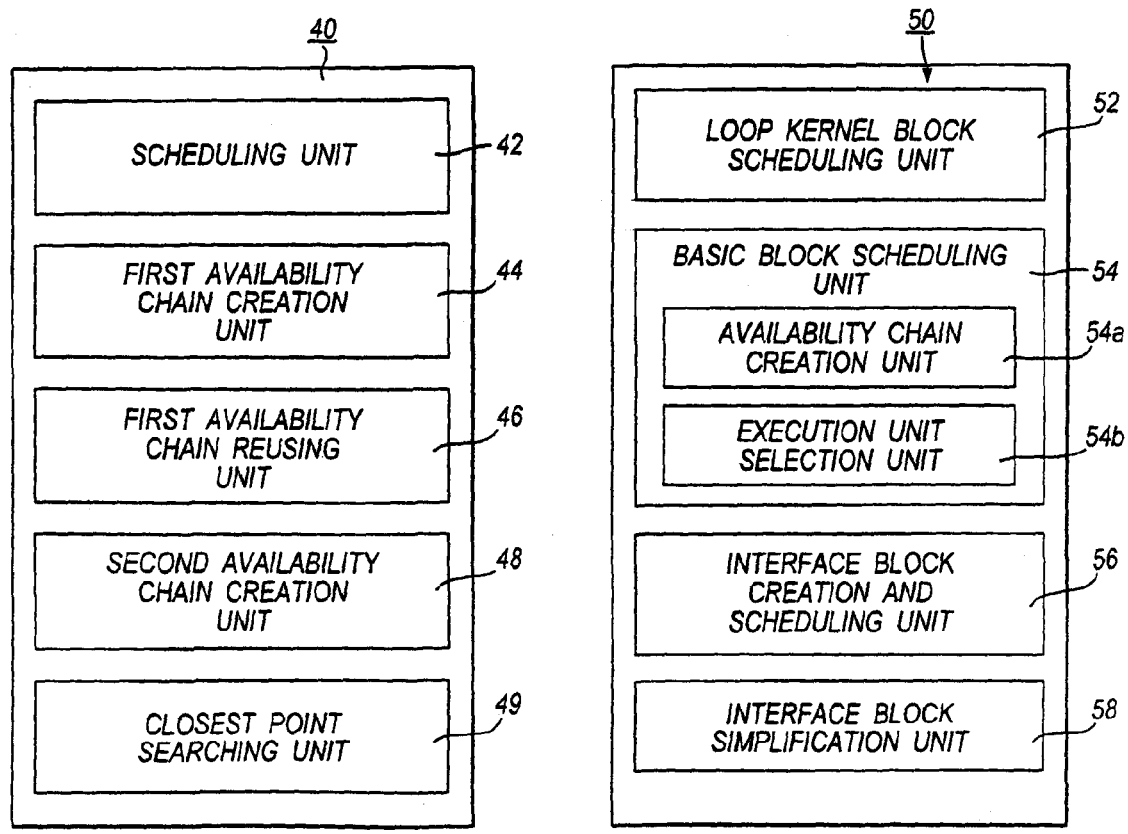
FIG. 10(B) is a block diagram of parts of compiling apparatus according to an embodiment of the present invention.
FIG. 10(C) is a block diagram of parts of compiling apparatus according to another embodiment of the present invention.

FIG. 10(B) shows parts of compiling apparatus suitable for carrying out a compiling method embodying the first aspect of the present invention. The apparatus 40 comprises a scheduling unit 42, a first availability chain creation unit 44 and a first availability chain reusing unit 46.

An object program being converted from a corresponding source program includes a producer instruction and first and second consumer instructions.

Both the first and second consumer instructions require a value produced by the producer instruction.

The scheduling unit 42 schedules the producer instruction for execution in a first execution unit of a processor. The scheduling unit 42 also schedules the first consumer instruction for execution by a second execution unit of the processor. The first availability chain creation unit 44 creates a first availability chain from the producer instruction to the first consumer instruction, the first availability chain comprising at least one move instruction for moving the required value from a first point accessible by the first execution unit to a second point accessible by the second execution unit.

The scheduling unit 42 also schedules the second consumer instruction for execution by an execution unit other than the first execution unit. The first availability chain of the reusing unit 46 reuses at least part of the first availability chain to move the required value to a point accessible by that other execution unit.

The apparatus 40 in FIG. 10(B) may also comprise a second availability chain creation unit 48. In the event that there is no point on the first availability chain that is already accessible by the other execution unit, the second availability chain creation unit 48 creates a second availability chain, comprising at least one move instruction, and starting from a point on the first availability chain that is close than the first point to the point accessible by that execution unit.

The apparatus 30 in FIG. 10(B) preferably also further comprises a closest point searching unit 49 which searches for the closest point on the first availability chain to the point accessible by that other execution unit. This closest point is supplied by the unit 49 to the second availability chain creation unit 48 which starts the second availability chain from the closest point.

FIG. 10(C) shows parts of compiling apparatus suitable for carrying out a compiling method embodying the third or fifth aspect of the present invention. An object program to be produced by the apparatus 50 includes a loop kernel block and a basic block preceding the loop kernel block. The basic block includes a producer instruction and the loop kernel block includes a consumer instruction requiring a value produced by the producer instruction.

The apparatus 50 comprises a loop kernel block scheduling unit 52 and a basic block scheduling unit 54.

The loop kernel block scheduling unit 52 schedules the instructions of the loop kernel block and, in particular, schedules the consumer instruction for execution by a first execution unit of the processor. After the scheduling of the loop kernel block by the unit 52, the basic block scheduling unit 54 schedules the instructions of the basic block, including in particular scheduling the producer instruction for execution by one of the execution units of the processor.

The basic block scheduling unit 54 includes an availability chain creation unit 54a which, if necessary, schedules within the basic block one or more move instructions for moving the required value to a first point accessible by the consumer instruction from a second point accessible by the producer instruction.

The basic block scheduling unit 54 also includes an execution unit selection unit 54b which selects the execution unit to execute the producer instruction in dependence upon the execution unit scheduled by the unit 52 to execute the consumer instruction (first execution unit). The unit 54b preferably selects a closest available one of the execution units to the first execution unit, and most preferably selects the first execution unit itself. Thus, no availability chain within the basic block may be required or, if one is required, it can include the minimum number of move instructions.

Preferably the apparatus further includes an interface block creation and scheduling unit 56. The unit 56 creates an interface block between the basic block and the loop kernel block, the interface block including a dummy instruction corresponding to the consumer instruction. Between the scheduling of the loop kernel block by the unit 52 and the scheduling of the basic block by the unit 54, the unit 56 schedules the interface block. This includes scheduling the dummy instruction for execution by the first execution unit so that the dummy instruction serves to guide the scheduling of the availability chain and/or producer instruction within the basic block subsequently carried out by the unit 54. The dummy instruction is unscheduled after the basic block has been scheduled by the unit 54.

The loop kernel block may include two or more such consumer instructions, each requiring the value produced by the producer instruction. In this case, the availability chain creation unit 54a creates an availability chain within the basic block for each consumer instruction, if necessary.

Preferably the apparatus 50 further comprises an interface block simplification unit 58. When two or more availability chains have been created within the basic block by the unit 54, the simplification unit 58 simplifies the interface block created by the unit 56 prior to the scheduling of the basic block by unit 54.

In this simplification two or more dummy instructions corresponding to different respective consumer instructions are combined into a single dummy instruction provided that those consumer instructions were scheduled by the loop ker-

What we claim is:

1. A compiling method, for converting a source program into a corresponding object program to be executed by a processor having a plurality of execution units operable in parallel, the object program including a loop kernel block and a basic block preceding said loop kernel block, and the basic block including a producer instruction and the loop kernel block including a consumer instruction requiring a value produced by said producer instruction, which method is carried out by electronic data processing apparatus and comprises the steps of:
    (a) scheduling the instructions of the loop kernel block, including scheduling said consumer instruction for execution by a first one of the execution units; and
    (b) after step (a) scheduling the instructions of the basic block, including scheduling said producer instruction for execution by a second one of the execution units, and also including scheduling at least one move instruction to create an availability chain within said basic block for moving the required value to a first point accessible by said consumer instruction from a second point accessible by said producer instruction.

2. A method as claimed in claim 1, comprising the further step of:
    (c) creating an interface block between said basic block and said loop kernel block, said interface block including a dummy instruction corresponding to said consumer instruction and, between steps (a) and (b), scheduling said interface block including scheduling said dummy instruction for execution by said first execution unit, so that the dummy instruction serves to guide the scheduling of the availability chain within said basic block in step (b), said dummy instruction being unscheduled after step (b).

3. A method as claimed in claim 1, wherein said loop kernel block includes two or more such consumer instructions, each requiring said value produced by said producer instruction, and such an availability chain is created within said basic block for each said consumer instruction.

4. A method as claimed in claim 2 wherein said loop kernel block includes two or more such consumer instructions, each requiring said value produced by said producer instruction, and such an availability chain is created within said basic block for each said consumer instruction; and
    said interface block created in step (c) is simplified prior to step (b) by combining into a single dummy instruction two or more dummy instructions corresponding to different respective consumer instructions provided that those consumer instructions were scheduled in step (a) for execution by execution units having access to the same point.

5. A compiling apparatus, for converting a source program into a corresponding object program to be executed by a processor having a plurality of execution units operable in parallel, the object program including a loop kernel block and a basic block preceding said loop kernel block, and the basic block including a producer instruction and the loop kernel block including a consumer instruction requiring a value produced by said producer instruction, which apparatus comprises:
    a loop kernel block scheduling unit which schedules the instructions of the loop kernel block and which is operable to schedule said consumer instruction for execution in a first one of the execution units;
    a basic block scheduling unit which schedules the instructions of said basic block after said scheduling of the loop-kernel-block instructions and which is operable to schedule said producer instruction for execution in a second one of the execution units and which is further operable to schedule at least one move instruction so as to create an availability chain within said basic block for moving the required value to a first point accessible by said consumer instruction from a second point accessible by said producer instruction; and
    a processor controlling said loop kernel block scheduling unit and said basic block scheduling unit.

6. A compiling method, for converting a source program into a corresponding object program to be executed by a processor having a plurality of execution units operable in parallel, the object program including a loop kernel block and a basic block preceding said loop kernel block, and the basic block including a producer instruction and the loop kernel block including a consumer instruction requiring a value produced by said producer instruction, which method is carried out by electronic data processing apparatus and comprises the steps of:
    (a) scheduling the instructions of the loop kernel block, including scheduling said consumer instruction for execution by a first one of the execution units; and
    (b) after step (a) scheduling the instructions of the basic block, including selecting, in dependence upon the scheduling in step (a) of said consumer instruction for execution by said first execution unit, one of the plurality of execution units to execute said producer instruction and scheduling said producer instruction for execution by the selected execution unit.

7. A method as claimed in claim 6, wherein the selected execution unit in step (b) is a closest available one of said plurality of execution units to said first execution unit.

8. A method as claimed in claim 6, wherein the producer instruction is scheduled for execution by said first execution unit.

9. A method as claimed in claim 6, comprising the further step of:
    (c) creating an interface block between said basic block and said loop kernel block, said interface block including a dummy instruction corresponding to said consumer instruction and, between steps (a) and (b), scheduling said interface block including scheduling said dummy instruction for execution by said first execution unit, so that the dummy instruction serves to guide the scheduling of the producer instruction within said basic block in step (b), said dummy instruction being unscheduled after step (b).

10. A compiling apparatus, for converting a source program into a corresponding object program to be executed by a processor having a plurality of execution units operable in parallel, the object program including a loop kernel block and a basic block preceding said loop kernel block, and the basic block including a producer instruction and the loop kernel block including a consumer instruction requiring a value produced by said producer instruction, which apparatus comprises:
    a loop kernel block scheduling unit which schedules the instructions of the loop kernel block and which is operable to schedule said consumer instruction for execution in a first one of the execution units; and
    a basic block scheduling unit which schedules the instructions of said basic block after said scheduling of the loop-kernel-block instructions and which is operable to select, in dependence upon the scheduling of said consumer instruction for execution by said first execution unit, one of the plurality of execution units to execute said producer instruction and which is further operable to schedule said producer instruction for execution by the selected execution unit; and a processor controlling said loop kernel block scheduling unit and said basic block scheduling unit.

11. A compiling method as claimed in claim 1, wherein each said point is a storage location of the processor in which said value is stored.

12. A compiling method as claimed in claim 11, wherein each said point is a register file accessible by one of the execution units.

13. A compiling method as claimed in claim 1, wherein the execution units of the processor are arranged in a predetermined configuration and each execution unit is provided with a transferring unit which transfers said required value to one or more points accessible by only a limited subset of the other execution units.

14. A compiling method as claimed in claim 13, wherein said execution units are arranged in a ring configuration and each execution unit has a moving unit which moves said required value only to a point accessible by a neighbouring one of said execution units in said ring configuration.

15. A compiling method as claimed in claim 13, wherein the or each said availability chain includes one such move instruction for each move of said required value from a point accessible by one execution unit to another point accessible by another execution unit.

16. A compiling method as claimed in claim 6, wherein each said point is a storage location of the processor in which said value is stored.

17. A compiling method as claimed in claim 16, wherein each said point is a register file accessible by one of the execution units.

18. A compiling method as claimed in claim 6, wherein the execution units of the processor are arranged in a predetermined configuration and each execution unit is provided with a transferring unit which transfers said required value to one or more points accessible by only a limited subset of the other execution units.

19. A compiling method as claimed in claim 18, wherein said execution units are arranged in a ring configuration and each execution unit has a moving unit which moves said required value only to a point accessible by a neighbouring one of said execution units in said ring configuration.

20. A compiling method as claimed in claim 18, wherein the or each said availability chain includes one such move instruction for each move of said required value from a point accessible by one execution unit to another point accessible by another execution unit.

* * * * *